United States Patent [19]

Miller et al.

[11] Patent Number: 4,766,177

[45] Date of Patent: Aug. 23, 1988

[54] HIGH SOLIDS COATINGS FOR PLASTIC SUBSTRATES

[75] Inventors: Susan M. Miller, Middleburg Hts.; Gary P. Craun, Berea; Perry A. Toman, Medina, all of Ohio

[73] Assignee: The Glidden Company, Cleveland, Ohio

[21] Appl. No.: 45,081

[22] Filed: May 4, 1987

[51] Int. Cl.$^4$ .............................................. C08L 75/06
[52] U.S. Cl. .................................... 525/131; 524/507;
525/127; 525/162; 525/440; 525/518; 428/412;
428/424.6; 428/424.7; 428/424.8; 428/425.9

[58] Field of Search ............... 525/127, 131, 440, 518; 524/507

[56] References Cited

U.S. PATENT DOCUMENTS 4,425,466  1/1984  Santer ................................... 524/512
4,665,128  5/1987  Cluff et al. ........................... 525/131

Primary Examiner—Theodore E. Pertilla
Attorney, Agent, or Firm—Thomas M. Schmitz

[57] ABSTRACT

Excellent adhesion of acrylic polymer coatings to plastic substrates can be obtained by the addition of an isocyanate modified polyester copolymer to the acrylic polymer coating.

6 Claims, No Drawings

HIGH SOLIDS COATINGS FOR PLASTIC SUBSTRATES

BACKGROUND OF THE INVENTION

This invention relates to high solids thermosetting protective coatings and particularly to polyester or acrylic copolymer high solids coatings containing an adhesion promoter based on an isocyanate modified polyester polymer. High solids coatings are non-aqueous coatings containing minor amounts of organic solvents and are particularly useful as coatings on appliances, aluminum extrusions, general metal surfaces, plastic and wood substrates.

Acrylic polymers are known to generally provide useful coatings exhibiting good film properties. These polymers can contain reactive functional groups which are coreactive with other polymers or resins to provide thermosetting binder systems. Such acrylic binders can be produced by solution or bulk polymerization of ethylenically unsaturated monomers including acrylic monomers. Solvent can be added in minor amounts to render the acrylic polymer fluent. Various acrylic polymers have been suggested to provide high solids polymeric compositions such as disclosed in U.S. Pat. No. 4,374,164, or combined other polymers such as suggested in U.S. Pat. Nos. 4,397,989 or 4,369,283. Copending and commonly assigned U.S. Ser. No. 836,744 filed Mar. 6, 1986 discloses low molecular weight acrylic copolymers combined with low molecular weight polyester polymer to provide high solids coatings whereas U.S. Pat. No. 4,397,989 discloses a high molecular weight acrylic copolymer in conjunction with a polyester polymer to provide acrylic high solids coatings.

It now has been found that acrylic copolymer high solids coatings can be formulated to provide excellent adhesion to plastic substrates by including an isocyanate modified polyester polymer in the coatings. The adhesion promoter comprises a polyester-urethane polymer of moderately high molecular weight and low hydroxyl functionality and provides substantially improved adhesion to plastic substrates such as polyvinyl chloride, polycarbonate, ABS, Noryl, polystyrene and various polymer blends and alloys. These and other advantages of this invention will become more apparent by referring to the detailed description of the invention along with the illustrative examples.

SUMMARY OF THE INVENTION

Briefly, the invention comprises an acrylic coating based on an acrylic copolymer binder combined with a urethane-polyester polymer adhesion promoter to provide adhesion to plastic substrates. The urethane-polyester adhesion promoter is an isocyanate modified polyester comprising by weight between 30% and 80% copolymerized polyols preferably diols, between 10% and 70% copolymerized carboxylic acids, with the remainder being copolymerized isocyanate. On a weight basis, the acrylic coating can contain between 1% and 70% urethane-polyester additive based on the binder system of acrylic copolymer plus the urethane-polymer.

DETAILED DESCRIPTION OF THE INVENTION

This composition comprises an acrylic copolymer high solids coating containing a urethane polyester adhesion promoter.

Referring first to the acrylic binder, the acrylic polymer comprises an organic solvent solution or bulk copolymerized ethylenically unsaturated monomers, including acrylic monomers, to produce a non-aqueous acrylic polymer containing reactive primary hydroxyl groups and having a number average molecular weight between 500 and 2500, and preferably between 900 and 1200. Number average molecular weights are typically measured by GPC according to ASTM methods such as D3016-72; D3536-76; D3593-80; or D3016-78. The acrylic polymers are liquid at room temperature and generally have a Tg between $-20°$ C. and $+20°$ C. as calculated by the Fox equation based on the ratio of specific monomers. The hydroxyl number of the acrylic polymer is broadly between 50 and 200 and preferably between 100 and 150. The acrylic polymer can be produced by bulk polymerization of ethylenically unsaturated monomers including acrylic monomers, activated by peroxide or azo or other free radical initiator at polymerization temperatures typically between $70°$ C. to $170°$ C. and preferably between $120°$ C. to $150°$ C. Typically 0.5 to 2% peroxide initiator is utilized based on the weight of the monomers. Typical polymerization initiators can include for instance benzoyl peroxide, t-butyl hydroperoxide, tertiary butyl perbenzoate, cumene peroxide and similar peroxide polymerization catalysts which are preferred. Other initiators include azo initiators such as azo bis isobutyrinitrile and persulfate or ammonium persulfates.

Copolymerizable ethylenically unsaturated monomers useful in producing the acrylic copolymer are monomers containing carbon-to-carbon unsaturation and include vinyl monomers, acrylic monomers, allylic monomers, acrylamide monomers, and mono- and dicarboxylic unsaturated acids. Vinyl esters include vinyl acetate, vinyl proprionate, vinyl butyrates, vinyl benzoates, vinyl isopropyl acetates and similar vinyl esters. Vinyl halides include vinyl chloride, vinyl fluoride, and vinylidene chloride. Vinyl aromatic hydrocarbons include styrene, methyl styrenes and similar lower alkyl styrenes, chlorostyrene, vinyl toluene, vinyl naphthalene, divinyl benzoate, and cyclohexene. Vinyl aliphatic hydrocarbon monomers include alpha olefines such as ethylene, propylene, isobutylene, and cyclohexene as well as conjugated dienes such as 1,3 butadiene, methyl-2-butadiene, 1,3-piperylene, 2,3 dimethyl butadiene, isoprene, cyclopentadiene, and dicyclopentadiene. Vinyl alkyl ethers include methyl vinyl ether, isopropyl vinyl ether, n-butyl vinyl ether, and isobutyl vinyl ether. Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomer include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl and cresyl glycidyl ethers reacted with acrylic and methacrylic acids, hydroxyl alkyl acrylates and methacrylates such as hydroxyethyl and hydroxypropyl acrylates and methacrylates, as well as amino acrylates and methacrylates. Acrylic acids include acrylic and methacrylic acid, ethacrylic acid, alpha-chloracrylic acid, alpha-cycanoacrylic acid, crotonic acid, beta-acryloxy propionic acid, and beta-stryl acrylic acid. Olefinic unsaturated acids include fumaric acid, maleic acid or anhydride, haconic acid, citraconic acid, mesaconic acid, muconic acid, glutaconic acid, aconitic acid, hydrosorbic acid, sorbic acid, alpha-chlorosorbic acid, cinnamic acid, and hydromuconic acid as well as esters of such acids. Ethylenically unsaturated carboxylic acid amides and derivatives can be added in very minor amounts up to 5% and can include acrylamides or methacrylamides such as N-methylol acrylamide, N-ethanol acrylamide, N-propanol acrylamide, N-methylol methacrylamide, N-ethanol methacrylamide, and similar alkyl acrylamide or methacrylamide monomers containing methyl, ethyl, propyl, n-butyl or iso-butyl alkyl groups.

Hydroxyl containing monomers are hydroxy containing ethylenically unsaturated monomers including hydroxyl alkyl acrylates such as 2-hydroxy ethyl acrylate and methacrylate, 2-hydroxypropyl acrylate and methacrylate, and similar hydroxy alkyl acrylates. On a weight basis, the monomers comprise at least 5% and preferably between 5% and 95% acrylic monomer, between 5% and 30% hydroxyl monomer, and the remainder being acrylic and/or other ethylenic monomers to provide an acrylic copolymer having an Acid No. between 1 and 30 and a Hydroxyl No. between 50 and 200.

Typical solvents useful in preparing the acrylic copolymer can include for instance, toluene, ethyl acetate, acetone, methylisobutyl ketone, methyl n-amyl ketone, methylisoamyl ketone, ethylamyl ketone, amyl acetone, methylethyl ketone, ethyl alcohol, mineral spirits, ethylene glycol monoethyl ether acetate, and other aliphatic, cycloaliphatic and aromatic hydrocarbon, esters, ethers, ketones and alcohols. After the polymerization is completed, solvents can be stripped off to increase the polymer solids content of the resulting polymer solution.

Preferred acrylic high solids compositions comprise an acrylic copolymer in conjunction with a linear polyester polymer to form the high solids acrylic binder component of the coating.

Referring next to the polyester component of the polymeric mixture, the polyester polymer is a low molecular weight linear polymer having a molecular weight between about 250 and 2,000 and preferably between 400 and 1,000 based on number average. Linear aliphatic, non-ether type glycols are esterified with considerably lesser molar amounts of aromatic dicarboxylic acid and a linear saturated dicarboxylic acid having between 2 and 10 linear carbon atoms such as adipic, azelaic, succinic, glutaric, pimelic, suberic or sebacic acid to produce low molecular weight polyesters. Preferred and commercially available linear saturated dicarboxylic acids are adipic or azelaic acid. Aromatic dicarboxylic acids (anhydrides) include phthalic, isophthalic, terephthalic, and tetrahydrophthalic. Isophthalic is preferred for superior films exhibiting detergent, salt spray and corrosion resistance. Suitable glycols include non-ether linear aliphatic glycols having 2 to 8 carbon atoms such as 1,3 or 1,4 butylene glycol, 1,6 hexane diol, neopentyl glycol, propylene glycol and similar linear glycols. Preferred glycol is neopentyl glycol. The molar excess of the glycol over the lesser molar amounts of aromatic and linear saturated dicarboxylic acid is between about 10% and 80% and preferably between about 20% and 60%. On a molar basis, the preferred low molecular weight polyester polymer comprises between 0.1 and 0.5 moles of aromatic dicarboxylic acid and 0.5 and 0.1 moles of linear saturated dicarboxylic acid per 1 mole of glycol. Hence, the polyester contains considerable excess unreacted hydroxyl groups to provide a hydroxy polyester having a hydroxyl number between 115 and 285 and preferably between 175 and 240. The polyester contains free carboxyl groups imparting an acid number that is preferably below 15 and typically between 5 and 10 mg KOH per gram of polyester. Glycol can be esterified with minor amounts of up to about 5% by weight of unsaturated dicarboxylic acids (anhydrides) including maleic, fumaric or itaconic acids; or monocarboxylic acids such as acetic, propyl-, and higher chain aliphatic acids up to about 8 carbon atoms. The polyester component can be produced by solvent or bulk polymerization although bulk polymerization is preferred. The raw materials can be charged in bulk and esterification polymerized at temperatures typically between 190° C. to 240° C. although moderately higher or lower temperatures can be utilized satisfactorily. An esterification catalyst can be used, typically at less than 1% levels based on charge, such as an organic tin compound.

Referring next to the urethane-polyester adhesion promoter, the polymer comprises copolymerized polyols and preferably diols, dicarboxylic acids, and isocyanates to produce a moderately high molecular weight polymer having a number average molecular weight between 700 and 10,000, and peferably between 1,000 and 5,000. Urethane-polyesters can be produced by first reacting glycols with dicarboxylic acids to form a linear polyester chain. Preferred polyesters contain a minor amount of mono carboxylic acids. Suitable glycols that can be esterified with dicarboxylic acids include for example ethylene glycol, propylene glycol, diethylene glycol, hydrogenated bisphenol A, dipropylene glycol, butanediol, hexanediol, and neopentyl glycol as well as minor amounts of polyols such as pentaerythritol, triethylene glycol, trimethylol propane, glycerol or mixtures thereof. The preferred glycols are primarily higher chain length glycols having more than 4 carbon atoms such as the butanediols and hexanediols. Neopentyl glycol is the preferred glycol. The dicarboxylic acids that can be esterified with the glycols are preferably aromatic dicarboxylic acids such as orthophthalic anhydride or acid, terephthalic acid, isophthalic acid, and saturated aliphatic dicarboxylic acids such as adipic acid, sebacic acid, succinic acid, and similar acids or anhydrides. Minor amounts of unsaturated dicarboxylic acids can be utilized to provide ethylenic unsaturation in the polymer chain, if desired, and can include for example acids or anhydrides of maleic, fumaric, mesaconic, itaconic, citraconic, or similar unsaturated dicarboxylic acids. Minor amounts of monocarboxylic acids can be included to reduce the hydroxyl functionality of the resulting polyester/urethane. Useful carboxylic acids include benzoic acid, nitro and dinitro benzoic acid, naphthanoic acid, octanoic acid, hexanoic acid, 2-ethyl hexanoic acid and various other aliphatic and aromatic carboxylic acids. The equivalent ratios of total carboxylic acid to glycol comprises between 0.5 and 0.8 equivalents of caboxylic acid to one equivalent of glycol to provide excess hydroxyl groups to react with lesser equivalents of isocyanate groups in accordance with tihs invention. Suitable isocyanates include methyl isocyanate; n-butyl isocyanate; cyclohexyl isocyanate; octadecyl isocyanate; hexamethylene diisocyanate; phenyl isocyanate; p-chlorophenyl isocyanate; 3,4-dichlorophenyl isocyanate; m-phenylene diisocyanate; 1,6-hexane diisocyante, isophorone diisocyante, cyclohexane, 1,1-methylenebis (4-isocyanate) e.g., Desmodur W, 2,4-toluene diisocyanate; trimethyl hexamethylene diisocyante, 2,6-toluene diisocyanate; and 4,4-diphenylmethane diisocyanate. The major portion of isocyanate is generally a diisocyanate such as isophorone diisocyanate. The resulting urethane-polyester polymer comprises on an equivalent basis copolymerized components as follows: one equivalent of hydroxyl component, between 0.5 and 0.8 equivalents carboxylic acid component, and between 0.01 and 0.4 equivalents of isocyanate component. The resulting urethane-polyester polymer as an adhesion promoter additive to acrylic copolymer binders can be added at a level of between 1% and 70% by weight based on the acrylic copolymer or the preferred acrylic-polyester binder system.

The foregoing hydroxyl functional, acrylic and polyester polymers can be combined with a coreative amine derivative cross-linking resin such as aminoplast including glycolurils. Examples of useful aminoplast resins are the reaction products of ureas and melamines with aldehydes further etherified with an alcohol. Examples of aminoplast resin components are urea, ethylene urea, thiourea, melamine, benzoguanamine. Aldehydes useful in this invention are formaldehyde, acetaldehyde and propionaldehyde, although formaldehyde is clearly preferred. The aminoplast resins can be used in the alkylol form but, most preferably, are utilized in the ether form by etherifying with a monohydric alcohol containing from 1 to about 8 carbon atoms. In a melamine molecule, for instance, up to 3 of the 6 active hydrogens on the amine group can be advantageously substituted with an alkanol group having 1-8 carbon atoms. Higher levels such as 6 substitution can be used as in Cymel 300 (1,3,5-triazine-2,4,6-triamine polymer) which contains 6 substituted methylol groups. The alkanol groups stabilize the melamine or other amine derivative under ordinary temperature, but enable reaction at higher temperatures. Preferred substitutions are between 2 and 4 substitutions to avoid popping or solvent entrapment with a fast curing film. Examples of aminoplast resins are methylol urea, dimethoxymethylol urea, butylated polymeric urea-formaldehyde resins, hexamethoxymethyl melamine, methylated polymeric melamine formaldehyde resin and butylated polymeric melamine formaldehyde resin. Glycoluril derivatives are disclosed in U.S. Pat. No. 4,064,191 and are also known as acetylendiureas. Glycolurils are derived by reacting two moles of urea with one mole of glyoxal to provide a complex ring structure where substitute constituents can be a hydrogen, or a lower alkyl radical, or can be methylolated partially or fully by reacting with 1 to 4 moles of formaldehyde to provide a methylol glycoluril. The preparation of various glycolurils is illustrated in U.S. Pat. No. 4,064,191 such as tetramethylol glycoluril, tetrabutoxymethyl glycoluril, partially methyolated glycoluril, tetramethoxymethyl glycoluril, and dimethoxydiethoxy glycoluril. Useful glycoluril derivatives include for example, mono- and dimethylether of dimethylol glycoluril, the trimethylether of tetramethylol glycoluril, the tetramethylether of tetramethylol glycoluril, tetrakisethoxymethyl glycoluril, tetrakispropoxymethyl glycoluril, tetrakisbutoxymethyl glycoluril, tetrakismyloxymethyl glycoluril, tetrakishexoxymethyl glycoluril and the like. Glycoluril derivatives can further include dimethylol dihydroxy ethylene urea which is disclosed in U.S. Pat. No. 4,540,735 and incorporated herein by reference.

On a polymer solids weight basis, the blend of polymers comprises broadly between 10% and 80% acrylic copolymer, between 0% and 40% polyester polymer, between 1% and 60% urethane-polyester adhesion promoter, and between 10% and 58.5% amine derivative cross-linking resin. Preferred polymeric blend compositions comprise 15% to 40% acrylic polymer, 15% to 30% polyester polymer, between 20% and 50% urethane-polyester adhesion promoter, and 20% and 40% cross-linker such as aminoplast resin.

In use, the acrylic copolymer containing amounts of primary hydroxyl groups can be used as a grind vehicle for preparing a pigmented vehicle base. Suitable pigments include titanium dioxides, carbon black, cadmiums, yellow, brown, and tan iron oxides as well as other oxide pigments and further include inert fillers such as talcs, clays, and fumed silicas. The acrylic polymer physically wets the titanium dioxide pigment surface for instance and further maintains the pigment in stable dispersion. Up to about six weight parts and typically between about 3.5 and 4 weight parts of pigment can be combined with one weight part of acrylic polymer depending on the adsorbtion properties of the pigment particles. Pigmented coatings typically comprise a pigment to binder ratio of about 1 to 1 for white or light colored paints. Black or dark colored paints may have a pigment to binder ratios as low as 0.5 to 1.0. The preformed acrylic polymer pigment grind can be combined with the polyester polymer, the urethane-polyester additive, and the amine derivative cross-linking resin.

The merits of this invention are further illustrated by the following examples wherein parts indicated are by weight and temperatures are in centigrade unless otherwise indicated.

EXAMPLE 1

Preparation of Modifying Polyester A:
Prepare a polyester-urethane as follows:

|   |   | Weight (grams) |
|---|---|---|
| A. | Neopentyl glycol | 312.6 |
|   | Adipic acid | 292.4 |
|   | 2-ethylhexanoic acid | 48.1 |
|   | Butylstanoic acid | 0.5 |
| B. | Xylene | 310.0 |
| C. | Isophorone diisocyanate | 148.0 |
|   | Dibutyl tin dilaurate | 0.5 |

Place (A) in a 2 liter flask. Stir, purge with nitrogen, and heat to 180° C. Collect distillate while raising temperature to 200° C. over 4 hours. Total distillate recovered should be 75-80 grams. Cool to 100° C. and add xylene. Adjust to 80° C. and add dibutyl tin dilaurate. Pump in isocyanate over 30 minutes, holding the batch temperature below 110° C. Hold batch 1 hour at 95° C. Cool to room temperature. The final acid number should be about 10 mg KOH/gram product.

Preparation of Modifying Polyester B:
Prepare as above, but use:

| | | Weight (grams) |
|---|---|---|
| A. | Neopentyl glycol | 312.6 |
| | Isophthalic acid | 249.3 |
| | Adipic acid | 73.1 |
| | 2-ethylhexanoic acid | 48.1 |
| | butylstanoic acid | 0.5 |
| B. | Xylene | 319.0 |
| C. | Dibutyl tin dilaurate | 0.5 |
| | Isophorone diisocyanate | 148.0 |

Preparation of Modifying Polyester C:
Prepare as above, but use:

| | | Weight (grams) |
|---|---|---|
| A. | Neopentyl glycol | 312.6 |
| | Isophthalic acid | 249.3 |
| | Adipic acid | 73.1 |
| | 3,5-dinitrobenzoic acid | 70.8 |
| | butylstanoic acid | 0.5 |
| B. | Xylene | 319.0 |
| C. | Dibutyl tin dilaurate | 0.5 |
| | Isophorone diisocyanate | 148.0 |

EXAMPLE 2

Preparation of a Modified High Solids Coating:

| | Weight (grams) |
|---|---|
| Dispersion phase | |
| [1]High Solids Acrylic | 31.25 |
| Methyl Amyl Ketone | 13.25 |
| Titanium Dioxide | 100.00 |
| Reduction Phase | |
| [2]High Solids Polyester | 23.33 |
| Modifying Polyester from Ex. 1B | 27.00 |
| —Methylated Melamine | 40.43 |
| Surfactant ([3]Additol XL-480) | 0.14 |
| Acid catalyst ([4]K-Cure 129-B) | 4.18 |
| Methanol | 12.50 |
| Xylene | 36.76 |

[1]A High Solids acrylic resin based on the reaction product of styrene, butyl acrylate, and 2-HEA.
[2]A High Solids polyester resin based on the reaction product of IPA, NPG, and Adipic acid.
[3]Additol XL-480 is a product of American Hoechst.
[4]K-Cure 129-B is a product of King Ind.

The coating is made and applied at 70% weight solids and then cured at 30 minutes at 150° F.

EXAMPLE 3

Adhesion Performance of the Modified High Solids Coating

| | % Adhesion Retention* | | | | |
|---|---|---|---|---|---|
| Modifying Polyester | PVC | PC | ABS | Noryl | Polystyrene |
| None | 100 | 100 | 0 | 0 | 0 |
| Polyester A | 100 | 100 | 90 | 20 | 0 |
| Polyester B | 100 | 100 | 95 | 80 | 0 |
| Polyester C | 100 | 100 | 100 | 100 | 80 |

*Adhesion determined by ASTM Standard Test No. D-3359B

The foregoing invention relates to the synthesis and utilization of certain polyester resins, especially polyester-urethane resins, as adhesion promoters to plastic substrates such as polyvinyl chloride, polycarbonate, ABS, Noryl, and polystyrene. Polyester resins have been synthesized using common acids, polyols, and isocyanates. These polyesters are characterized by moderately high molecular weight and low hydroxyl functionality. When polyesters of this type are added to typical High Solids acrylic-polyester coating formulas, adhesion to plastic substrates is improved. The foregoing description and illustrative examples are not intended to be limited except by the appended claims.

We claim:

1. A high solids thermosetting coating composition comprising on a weight basis a blend of polymers comprising:
   between 10% and 80% acrylic copolymer, between 0% and 40% polyester polymer, between 1% and 60% urethane-polyester adhesion promoter, and between 10% and 58.5% amine crosslinking resin selected from an aminoplast or a glycoluril, where the total equals 100%;
   said acrylic copolymer being copolymerized monomers by weight comprising at least 5% acrylic monomer, between 5% and 30% hydroxyl containing ethylenically unsaturated monomer, with the balance being other ethylenically unsaturated monomer, said acrylic copolymer having a number average molecular weight measured by GPC between 500 and 2500 and a hydroxyl number between 50 and 200;
   said polyester polymer having a number average molecular weight measured by GPC between 250 and 2000 and a hydroxyl number between 115 and 285;
   said urethane-polyester adhesion promoter having a number average molecular weight measured by GPC between 700 and 10,000 and comprising copolymerized components per equivalent of hydroxyl component, between 0.5 and 0.8 equivalents of carboxylic acid component and between 0.01 and 0.4 equivalents of isocyanate component; and
   where said amine cross-linking resin is adapted to cross-link with said acrylic copolymer and said polyester polymer to provide a thermosetting coating composition 2. The composition in claim 1 wherein the polymer blend comprises on a weight basis between 15% and 40% acrylic-copolymer, between 15% and 30% polyester polymer, between 20% and 50% urethane-polyester adhesion promoter, and between 20% and 40% said amine cross-linking resin where the total equals 100%.

3. The composition in claim 2 wherein the urethane-polyester adhesion promoter comprises by weight between 30% and 80% copolymerized diols, between 10% and 70% copolymerized carboxylic acids, and between 10% and 40% isocyanate, where the total equals 100%.

4. The composition in claim 2 wherein the urethane-polyester adhesion promoter comprises a linear polyester polymer and the copolymerized carboxylic acid comprises a mixture of dicarboxylic acid and a minor amount of monocarboxylic.

5. The composition in claim 3 wherein the urethane-polyester adhesion promoter has a molecular weight between 1,000 and 5,000.

6. A high solids, thermosetting coating composition for plastic substrates comprising on a weight basis a blend of polymers, comprising:
   between 10% and 80% acrylic copolymer being copolymerized monomers comprising by weight at least 5% acrylic monomer, between 5% and 30% hydroxyl containing ethylenically unsaturated monomer, with the balance being other ethylenically unsaturated monomers, where said acrylic copolymer has a number average molecular weight measured by GPC between 500 and 2500 and a hydroxyl number between 50 and 200;

between 0% and 40% polyester polymer having a number average molecular weight measured by GPC between 250 and 2000 and a hydroxyl number between 115 and 285;

between molecular weight measured by GPC between 700 and 10,000, where said adhesion promoter is an isocyanate modified polyester polymer comprising by weight between 30% and 80% copolymerized diol and polyol, between 10% and 70% copolymerized carboxylic acid with the remainder being copolymerized isocyanate where said isocyanate modified polyester polymer promotes adhesion of the coating to plastic substrates; and between 10% and 58.5% amine cross-linking resin selected from an aminoplast or a glycoluril, where said amine cross-linking resin is adapted to cross-linking with said acrylic copolymer and said polyester polymer to provide a thermosetting coating composition.

* * * * *